United States Patent
Doreau et al.

(10) Patent No.: US 8,574,672 B2
(45) Date of Patent: Nov. 5, 2013

(54) POLYESTER POLYMER AND COATING COMPOSITIONS THEREOF

(75) Inventors: Nicolas Doreau, Passy (FR); Benoit Prouvost, L'Abergement de Cuisery (FR); Paul Stenson, Gattikon (CH); Charles Skillman, Zelienople, PA (US); Paul Share, Wexford, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 78 days.

(21) Appl. No.: 13/114,447

(22) Filed: May 24, 2011

(65) Prior Publication Data

US 2012/0125799 A1   May 24, 2012

Related U.S. Application Data

(63) Continuation-in-part of application No. PCT/US2009/065848, filed on Nov. 25, 2009.

(60) Provisional application No. 61/118,224, filed on Nov. 26, 2008.

(51) Int. Cl.
*B05D 7/22* (2006.01)

(52) U.S. Cl.
USPC .............. 427/239; 413/1; 413/18; 206/524.3; 523/100

(58) Field of Classification Search
None
See application file for complete search history.

(56) References Cited

U.S. PATENT DOCUMENTS

| | | | |
|---|---|---|---|
| 3,166,434 A | 1/1965 | Gauger, Jr. | |
| 3,306,868 A | 2/1967 | Adrian, Jr. | |
| 3,333,022 A | 7/1967 | Adrian, Jr. | |
| 3,340,327 A | 9/1967 | Spellberg et al. | |
| 3,448,066 A | 6/1969 | Parker | |
| 3,477,996 A | 11/1969 | Formaini | |
| 3,674,727 A | 7/1972 | Fekete et al. | |
| 3,867,480 A | 2/1975 | Fujiyoshi et al. | |
| 3,919,063 A | 11/1975 | Maruyama et al. | |
| 3,933,757 A | 1/1976 | Pratt et al. | |
| 3,965,059 A | 6/1976 | Kerridge et al. | |
| 3,986,992 A | 10/1976 | Canning et al. | |
| 3,988,288 A | 10/1976 | Yamauchi et al. | |
| 4,010,130 A | 3/1977 | Matsuo et al. | |
| 4,073,827 A | 2/1978 | Okasaka et al. | |
| 4,167,542 A | 9/1979 | Nelson | |
| 4,206,291 A | 6/1980 | Takahashi et al. | |
| 4,340,519 A | 7/1982 | Kotera et al. | |
| 4,360,647 A | 11/1982 | Hefner, Jr. | |
| 4,443,580 A | 4/1984 | Hefner, Jr. | |
| 4,452,954 A | 6/1984 | Schade et al. | |
| 4,522,977 A | 6/1985 | Gardner | |
| 4,631,320 A | 12/1986 | Parekh et al. | |
| 4,777,196 A | 10/1988 | Hefner, Jr. | |
| 5,252,682 A | 10/1993 | Bayha | |
| 5,290,828 A | 3/1994 | Craun et al. | |
| 5,739,215 A | 4/1998 | Westerhof et al. | |
| 5,916,979 A | 6/1999 | Koegler et al. | |
| 6,048,949 A | 4/2000 | Muthiah et al. | |
| 6,306,934 B1 | 10/2001 | Bode et al. | |
| 6,413,648 B1 | 7/2002 | Heyenk et al. | |
| 6,472,480 B1 | 10/2002 | Anderson | |
| 6,512,025 B2 | 1/2003 | Choudhery | |
| 6,710,151 B2 | 3/2004 | Kuwatsuka et al. | |
| 6,893,678 B2 | 5/2005 | Hirose et al. | |
| 6,930,161 B2 | 8/2005 | Schwarte et al. | |
| 6,974,631 B2 | 12/2005 | Hayes et al. | |
| 7,198,849 B2 | 4/2007 | Stapperfenne et al. | |
| 7,326,752 B2 | 2/2008 | McAlvin et al. | |
| 7,517,559 B2 | 4/2009 | Thiebes et al. | |
| 7,763,323 B2 | 7/2010 | Mayr et al. | |
| 2003/0064185 A1 | 4/2003 | Mazza et al. | |
| 2004/0044117 A1 | 3/2004 | Kiefer-Liptak et al. | |
| 2004/0171746 A1* | 9/2004 | Parekh et al. | 524/589 |
| 2005/0014012 A1* | 1/2005 | Stapperfenne et al. | 428/480 |
| 2005/0038162 A1 | 2/2005 | Kuhlmann et al. | |
| 2005/0129847 A1* | 6/2005 | Thiebes et al. | 427/230 |
| 2005/0196629 A1 | 9/2005 | Bariatinsky | |
| 2006/0093768 A1 | 5/2006 | Parekh et al. | |
| 2006/0149019 A1* | 7/2006 | Wamprecht et al. | 528/44 |
| 2007/0281179 A1* | 12/2007 | Ambrose et al. | 428/480 |
| 2008/0015302 A1* | 1/2008 | Kiefer-Liptak et al. | 524/523 |
| 2008/0262613 A1 | 10/2008 | Gogolewski | |
| 2010/0056726 A1 | 3/2010 | Payot et al. | |
| 2010/0260954 A1 | 10/2010 | Stenson et al. | |
| 2011/0290696 A1 | 12/2011 | Stenson et al. | |
| 2012/0027974 A1 | 2/2012 | Skillman et al. | |
| 2012/0058354 A1 | 3/2012 | Hayes et al. | |

FOREIGN PATENT DOCUMENTS

| | | |
|---|---|---|
| CA | 2084737 A1 * | 6/1993 |
| EP | 0548727 A2 | 6/1993 |
| EP | 0583777 A1 | 2/1994 |
| EP | 0780455 A2 | 6/1997 |
| EP | 1498461 A1 | 1/2005 |
| EP | 1474490 B1 | 6/2005 |
| EP | 1627898 A1 | 2/2006 |
| GB | 1280404 | 7/1972 |
| WO | 9407932 A1 | 4/1994 |
| WO | 9726304 A1 | 7/1997 |
| WO | 2008036629 A2 | 3/2008 |
| WO | 2009117330 A1 | 9/2009 |
| WO | 2010055019 A1 | 5/2010 |

OTHER PUBLICATIONS

International Search Report and Written Opinion for corresponding International Application No. PCT/US2009/065848 mailed on May 7, 2010 (12 pages).

* cited by examiner

*Primary Examiner* — Timothy Meeks
*Assistant Examiner* — Michael P Rodriguez

(57) ABSTRACT

A polymer and coating compositions containing the polymer are provided that are useful in coating applications such as, for example, food or beverage packaging coatings. The polymer preferably includes a polyester backbone and at least one deblockable isocyanate group attached to the backbone. In one embodiment, the polymer includes a polyester-carbamate backbone, one or more pendant deblockable isocyanate groups, and one or more terminal or pendant isocyanate-reactive groups. The deblockable isocyanate groups may be provided, for example, through use of a partially blocked polyisocyanate.

20 Claims, No Drawings

POLYESTER POLYMER AND COATING COMPOSITIONS THEREOF

CROSS-REFERENCE TO RELATED APPLICATION(S)

This application is a continuation-in-part application of International Application Ser. No. PCT/US2009/065848 filed on Nov. 25, 2009 (now published as WO 2010/062928) which claims the benefit of Provisional Application No. 61/118,224 filed on Nov. 26, 2008, each of which is incorporated herein by reference in its entirety.

TECHNICAL FIELD

This invention relates to a polymer that may be included in a coating composition for use, for example, on a packaging article.

BACKGROUND

The application of coatings to metals to retard or inhibit corrosion is well established. This is particularly true in the area of metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid, which is particularly problematic with high-salt-content food products.

Packaging coatings should preferably be capable of high-speed application to substrate and provide the necessary balance of properties when hardened to perform in this demanding end use. For example, the coating should be safe for food-contact, not adversely affect the taste of the packaged food or beverage product, have excellent adhesion to the substrate, exhibit suitable flexibility, resist staining and other coating defects such as "popping," "blushing" and/or "blistering," and resist degradation over long periods of time, even when exposed to harsh environments. In addition, a coating for a food or beverage container should generally be capable of maintaining suitable film integrity during container fabrication and be capable of withstanding the processing conditions that the container may be subjected to during product packaging. Given the above challenges it is generally understood in the packaging art that compositions used in other applications (such as, for example, automobile coatings) are more often than not incapable of fulfilling the balance of stringent coating properties required for food-contact packaging coatings. Moreover, no reliable method exists to predict whether a particular class of coatings will pass all of these stringent requirements.

As a result of numerous experiments and field trials, various coatings have found use as interior protective coatings for food or beverage containers. Such coatings include epoxy-based coatings and polyvinyl-chloride-based coatings. Each of these coating types, however, has shortcomings. For example, the recycling of materials containing polyvinyl chloride or related halide-containing vinyl polymers may be problematic. There is also a desire by some to reduce or eliminate certain epoxy compounds used to formulate food-contact epoxy coatings.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has been a tradeoff between corrosion resistance and fabrication properties for such coatings. Polyester-based coatings suitable for food-contact that have exhibited both good fabrication properties and an absence of aged plate crazing having tended to be too soft and exhibit unsuitable corrosion resistance. Conversely, polyester-based coatings suitable for food-contact that have exhibited good corrosion resistance have typically exhibited poor flexibility and unsuitable crazing when fabricated.

Thus, there is a continuing need for improved coating compositions.

SUMMARY

In one aspect, the invention provides a polymer suitable for use in coating applications. The polymer includes a backbone, preferably a polyester backbone, and one or more blocked isocyanate pendant groups attached to the backbone. One or more isocyanate-reactive terminal or pendant groups are preferably attached to the backbone, such as an amide group, an amino group, a carboxylic group, a hydroxyl group, a phenol group, a thiol group, a urea group, or combination thereof. In a presently preferred embodiment, the backbone of the polymer is hydroxyl-terminated. The polymer preferably includes at least one "deblockable" blocked isocyanate group (referred to hereinafter as a "deblockable isocyanate group"), whereby the blocked isocyanate group deblocks under suitable curing conditions and is available for reaction with an isocyanate-reactive group. The polymer may optionally include one or more aliphatic carbon-carbon double bonds, including, for example, one or more unsaturated bicyclic groups.

In another aspect, the invention provides a method for making a polymer suitable for use, for example, as a film-forming polymer in coating applications. In one embodiment, the method includes providing reactants that include (i) a partially blocked polyisocyanate, preferably having on average from about 1.5 to about to about 2.5 free isocyanate groups; and (ii) a polyester oligomer or polymer having terminal isocyanate-reactive groups, preferably terminal hydroxyl groups. The ratio of free isocyanate groups in (i) to terminal isocyanate-reactive groups in (ii) is preferably less than 1:1. The reactants are reacted to form a polyester polymer having at least one pendant blocked isocyanate group that is preferably deblockable under suitable film-curing conditions.

In another aspect, the invention provides a coating composition that includes a polymer described herein. The coating composition may be used in a variety of applications, including as a packaging coating such as a food-contact packaging coating. The coating composition includes a polymer of the invention, typically a polyester or polyester-carbamate polymer, in combination with an optional crosslinker and/or optional liquid carrier. In one embodiment, the coating composition includes (i) a polymer of the invention having a polyester backbone with pendant or terminal isocyanate-reactive functional groups and a pendant deblockable isocyanate group attached to the backbone, (ii) a crosslinker, preferably a phenolic crosslinker and more preferably a resole-type phenolic crosslinker, and (iii) a liquid carrier.

In yet another aspect, the invention provides a method for forming a coating composition described herein.

In yet another aspect, the invention provides a coated article such as, for example, a food or beverage container or a portion thereof having a coating composition of the invention adhered on at least a portion of a surface thereof. The coating composition may be present on the coated article as a monolayer coating system or may constitute one or more layers of a multi-layer coating system.

In yet another aspect, the invention provides a method of making a coated article, more preferably a method of making a packaging container (e.g., a food or beverage container) or a portion thereof. A coating composition of the invention is applied to a substrate, typically a metal substrate, prior to or after forming the metal substrate into a packaging container or a portion thereof. The coating composition may be applied to an external surface of the packaging container, an internal surface of the packaging container (e.g., a food or beverage-contact surface, a drug-contact surface, etc.), or a combination thereof. In one embodiment, the coating composition of the invention is applied to at least a portion of a planar metal surface and then cured prior to forming the metal substrate into a packaging container or a portion thereof.

The above summary of the invention is not intended to describe each disclosed embodiment or every implementation of the invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

Selected Definitions

Unless otherwise specified, the following terms as used herein have the meanings provided below.

A group that may be the same or different is referred to as being "independently" something. Substitution is anticipated on the organic groups of the compounds of the invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "substantially free" of a particular mobile compound means that the compositions of the present invention contain less than 100 parts per million (ppm) of the recited mobile compound.

The term "essentially free" of a particular mobile compound means that the compositions of the invention contain less than 10 ppm of the recited mobile compound.

The term "essentially completely free" of a particular mobile compound means that the compositions of the invention contain less than 1 ppm of the recited mobile compound.

The term "completely free" of a particular mobile compound means that the compositions of the invention contain less than 20 parts per billion (ppb) of the recited mobile compound.

If the aforementioned phrases are used without the term "mobile" (e.g., "substantially free of XYZ compound") then the compositions of the invention contain less than the aforementioned amount of the compound whether the compound is mobile in the coating or bound to a constituent of the coating.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

The term "dispersion" in the context of a dispersible polymer refers to the mixture of a dispersible polymer and a carrier. The term "dispersion" is intended to include the term "solution."

The term "organosol" refers to a dispersion of thermoplastic particles (e.g., polyvinyl chloride particles) in a liquid carrier that includes an organic solvent or a combination of an organic solvent and a plasticizer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "aliphatic" when used in the context of a carbon-carbon double bond includes both linear aliphatic carbon-carbon double bonds and cycloaliphatic carbon-carbon double bonds, but excludes carbon-carbon double bonds of aromatic rings.

The term "unsaturation" when used in the context of a compound refers to a compound that includes at least one non-aromatic (i.e., aliphatic) carbon-carbon double bond.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention provides a polymer, as well as a hardenable coating composition including the polymer. The polymer of the invention is useful as a film-forming (or binder) polymer in a coating composition. For purposes of convenience, the polymer of the invention is referred to hereinafter as a "binder polymer." While certain preferred embodiments of the polymer of the invention are suitable for use as a binder of a coating composition, this usage is not intended to limit the use of the polymer in any way, for it is within the scope of the invention to employ the polymer for other purposes.

The binder polymer of the invention is useful in a variety of coating compositions. In one aspect, the invention provides a coating composition that includes the binder polymer and an optional crosslinker. The coating composition of the invention will typically include a liquid carrier such as a solvent-based carrier, a water-based carrier, or a liquid carrier that includes both water and organic solvent. While liquid coating systems are presently preferred, it is within the scope of the invention to apply a composition including the binder polymer, or the binder polymer itself, to a substrate via coating methods that do not use a liquid carrier system. For example, techniques such as powder coating, extrusion coating, and/or lamination may be used to apply coating compositions of the invention to substrate.

The binder polymer of the invention may include a backbone of any suitable structural configuration. The backbone can have different structural configurations depending on a variety of factors such as the materials used to form the backbone, cost, and the desired end use for the polymer. In preferred embodiments, the binder polymer includes a polyester backbone that may optionally include one or more other backbone linkages (or groups) such as, for example, amide linkages, carbamate linkages, carbonate ester linkages, urea linkages, or a combination thereof. Unless otherwise noted herein, the term "polyester backbone" refers to both polymer backbones that are exclusively polyester in nature as well as polymer backbones that include one or more polyester segments (typically a plurality of such segments) and one or more other segments. In a presently preferred embodiment, the polyester backbone is a polyester-carbamate backbone that includes a plurality of both ester and carbamate linkages.

The polyester backbone preferably includes at least one polyester oligomer or polymer segment and, more preferably, a plurality of such segments. The polyester segments may be attached on at least one end to another portion of the backbone via a condensation linkage such as an amide, ester, carbamate, carbonate ester, or urea linkage. More typically, the polyester segments are attached on one or both ends to another portion of the backbone via a carbamate linkage. In one such embodiment, a polyester segment is attached on at least one end to another segment of the backbone provided by a polyisocyanate compound (e.g., a partially blocked polyisocyanate compound).

If desired, the polyester segments may include polymer linkages, side chains, and end groups not related to simple polyol and polycarboxylic acid components. In some embodiments, alkyd compounds or fatty acids may be useful for forming the polyester segments and/or the binder polymer.

Suitable polyester backbone segments may be formed in situ during production of the binder polymer or may be provided by a preformed polyester oligomer or polymer (hereinafter referred to as a "polyester intermediate"). In certain preferred embodiments, at least some of the polyester intermediate includes at least one, and more preferably two, isocyanate-reactive functional groups, which are more preferably terminal end groups. Examples of isocyanate-reactive functional groups include amide, amino, carboxylic, hydroxyl, phenol, thiol, urea, or a combination thereof. Hydroxyl groups are preferred isocyanate-reactive groups, with terminal hydroxyl groups being particularly preferred. Preferred polyester intermediates have a hydroxyl number of about 15 to about 200, more preferably about 25 to about 150, and even more preferably about 35 to about 115. In a presently preferred embodiment, a preformed hydroxyl-functional polyester intermediate is used.

In some embodiments, the binder polymer includes one or more pendant and/or terminal isocyanate-reactive functional groups. Hydroxyl groups are preferred, with terminal hydroxyl groups being particularly preferred. Thus, in a presently preferred embodiment, the backbone of the binder polymer is hydroxyl terminated. The isocyanate-reactive groups can be incorporated into the binder polymer using any suitable technique or materials. For example, in some embodiments, an excess of polyester intermediate terminated with isocyanate-reactive groups may be used to form the binder polymer. In other embodiments, the binder polymer may be modified (e.g., after formation) to include one or more isocyanate-reactive functional groups.

The binder polymer preferably includes at least one blocked isocyanate group, more preferably at least one "deblockable" blocked isocyanate group (hereinafter referred to as a "deblockable isocyanate group"). An example of a deblockable isocyanate group is a blocked isocyanate group where the blocking group, under suitable film-curing conditions, can either (i) disassociate to liberate a free (or unblocked) isocyanate group or (ii) be displaced or replaced by another group or component. The deblockable isocyanate group is preferably capable of de-blocking under suitable film-curing conditions so that a covalent linkage can be formed during curing via reaction of the deblockable isocyanate group with another group (e.g., an isocyanate-reactive group such as a hydroxyl group) of the binder polymer itself, another binder polymer, an optional crosslinker, or another optional compound. Preferably, at least a substantial portion, and more preferably a majority, of the deblockable isocyanate groups are capable of deblocking during exposure to suitable film-curing conditions. For example, a substantial portion (more preferably at least a majority) of the deblockable isocyanate groups preferably unblock when a planar metal substrate coated with a coating composition containing the binder polymer is either (a) heated in a 190° C. oven for about 20 minutes or (b) heated in a 250° C. oven for about 10 seconds. Preferred deblockable isocyanate groups do not appreciably unblock at room temperature, more preferably do not appreciably unblock at a temperature of less than about 50° C., and even more preferably do not appreciably unblock at a temperature of less than about 100° C.

As previously discussed, the backbone of the binder polymer preferably includes at least one terminal hydroxyl group, and more preferably two terminal hydroxyl groups. The binder polymer preferably has a hydroxyl number of at least about 5, more preferably at least about 10, and even more preferably at least about 15. Preferably, the binder polymer has a hydroxyl number of less than about 200, more preferably less than about 150, and even more preferably less than about 100. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D 1957-86 (Reapproved 2001) entitled "Standard Test Method for Hydroxyl Value of Fatty Oils and Acids" and available from the American Society for Testing and Materials International of West Conshohocken, Pa.

The binder polymer may be a self-crosslinking polymer that includes at least two complimentary reactive functional groups, preferably at least one of which is a deblockable isocyanate group. For example, in a presently preferred embodiment, the binder polymer includes (i) at least one deblockable isocyanate group and (ii) at least one, and more preferably two or at least two, terminal and/or pendant isocyanate-reactive functional groups.

Preferred self-crosslinking binder polymers have an equivalents ratio of deblockable isocyanate groups to isocyanate-reactive groups of about 0.1:1 to about 10:1, more preferably about 0.2:1 to about 5:1, and even more preferably about 0.5:1 to about 2:1. In one such embodiment, the binder polymer has an equivalent ratio of deblockable isocyanate groups to terminal hydroxyl groups of about 0.1:1 to about 10:1, more preferably about 0.2:1 to about 5:1, and even more preferably about 0.5:1 to about 2:1.

The molecular weight of the binder polymer can vary depending upon material choice and the desired end use. In preferred embodiments, the binder polymer has a number average molecular weight (Mn) of at least about 1,000, more preferably at least about 1,500, and even more preferably at least about 3,000. Preferably, the Mn of the binder polymer is less than about 20,000, more preferably less than about 15,000, and even more preferably less than about 10,000.

In presently preferred embodiments, the binder polymer is a reaction product of a partially blocked polyisocyanate compound and a polyester intermediate having terminal isocyanate-reactive functional groups. The equivalents ratio of free isocyanate groups in the partially blocked polyisocyanate compound to isocyanate-reactive groups in the polyester intermediate is preferably less than 1:1, more preferably about 0.25:1 to about 0.9:1, and even more preferably about 0.5:1 to about 0.8:1. Thus, in some embodiments, such as where a partially blocked polyisocyanate compound and a hydroxyl-terminated polyester intermediate are used, the equivalents ratio of free isocyanate groups in the partially blocked polyisocyanate compound to hydroxyl groups in the hydroxyl-terminated polyester is preferably less than 1:1, more preferably about 0.25:1 to about 0.9:1, and even more preferably about 0.5:1 to about 0.8:1.

The molecular weight of the polyester intermediate used may vary widely depending upon, for example, the desired molecular weight of the binder polymer and/or the amount of polyisocyanate compound to be incorporated into the binder polymer. For example, to prepare a binder polymer having a desired molecular weight, two molecules of a polyester intermediate having a molecular weight of "X" could be used or, alternatively, four molecules of a polyester intermediate having a molecular weight of one-half X could be used, and so on. In certain preferred embodiments, the polyester intermediate has an Mn of preferably about 500 to about 10,000, more preferably about 750 to about 7,000, and even more preferably about 1,000 to about 5,000.

Examples of suitable polycarboxylic acids for use in forming polyester portions of the binder polymer, or precursors thereof, include dicarboxylic acids and polyacids having higher acid functionality (e.g., tricarboxylic acids, tetracarboxylic acids, etc.), precursors or derivatives thereof (e.g., an esterifiable derivative of a polycarboxylic acid, such as a dimethyl ester or anhydride), or mixtures thereof. Diacids are presently preferred. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, tetrahydrophthalic acid, isophthalic acid, trimellitic acid, terephthalic acid, naphthalene dicarboxylic acid, cyclohexane-dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol.

Examples of suitable polyols for use in forming polyester portions of the binder polymer, or precursors thereof, include diols, polyols having three or more hydroxyl groups (e.g., triols, tetraols, etc.), and combinations thereof. Diols are presently preferred. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), and mixtures thereof. If desired, adducts of polyol compounds (e.g., triols, tetraols, etc.) and monofunctional compounds may be used. An example of one such adduct is dipentaerythritol pre-reacted with benzoic acid.

As discussed above, the binder polymer is preferably a reaction product of ingredients including one or more polyisocyanate compounds. Any suitable polyisocyanate compound may be employed, including compounds having two or more, three or more, or four or more free and/or blocked isocyanate groups. In one embodiment, the polyisocyanate compound is a trifunctional "trimer" that is a trimerization product prepared from on average three diisocyanate molecules. In another embodiment, the polyisocyanate compound is a trimer prepared from on average three moles of diisocyanate (e.g., HMDI) reacted with one mole of another compound such as, for example, a triol (e.g., trimethylolpropane). Suitable diisocyanates for use alone, or in forming a trimer, may include isophorone diisocyanate (i.e., 5-isocyanato-1-isocyanatomethyl-1,3,3-trimethylcyclohexane); 5-isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl)cyclohexane; 1-isocyanato-2-(3-isocyanatoeth-1-yl)cyclohexane; 1-isocyanato-2-(4-isocyanatobut-1-yl)cyclohexane; 1,2-diisocyanatocyclobutane; 1,3-diisocyanatocyclobutane; 1,2-diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate; trimethylene diisocyanate; tetramethylene diisocyanate; pentamethylene diisocyanate; hexamethylene diisocyanate; ethylethylene diisocyanate; trimethylhexane diisocyanate; heptamethylene diisocyanate; 2-heptyl-3,4-bis(9-isocyanatononyl)-1-pentyl-cyclohexane; 1,2-, 1,4-, and 1,3-bis(isocyanatomethyl)cyclohexane; 1,2-, 1,4-, and 1,3-bis(2-isocyanatoeth-1-yl)cyclohexane; 1,3-bis(3-isocyanatoprop-1-yl)cyclohexane; 1,2-, 1,4- or 1,3-bis(4-isocyanatobuty-1-yl)cyclohexane; liquid bis(4-isocyanatocyclohexyl)-methane; and derivatives or mixtures thereof. Aliphatic isocyanates are presently preferred, with isophorone diisocyanate ("IPDI") and hexamethylene diisocyanate ("HMDI") being particularly preferred.

Preferably, the polyisocyanate compound is a partially blocked polyisocyanate. Preferred partially blocked polyisocyanates contain, on average, at least about 1.5, more preferably at least about 1.8, and even more preferably at least about 2 free (or unblocked) isocyanate groups per molecule of partially blocked polyisocyanate. The partially blocked polyisocyanates preferably contain, on average, less than about 3, more preferably less than about 2.5, and even more preferably less than about 2.2 free isocyanate groups per molecule of partially blocked polyisocyanate.

Preferred partially blocked polyisocyanates contain, on average, at least about 0.5, more preferably at least about 0.7, and even more preferably at least about 1 blocked isocyanate group per molecule of partially blocked polyisocyanate. The blocked isocyanate groups of the at least partially blocked polyisocyanate can be any suitable combination of deblockable and/or non-deblockable isocyanate groups. In preferred embodiments, at least some of the blocked isocyanate groups are deblockable isocyanate groups, and more preferably all or substantially all of the blocked isocyanate groups are deblockable.

Partially blocked isocyanate trimers are preferred polyisocyanate compounds for producing binder polymers of the invention. While not intending to be bound by any theory, the use of a partially blocked isocyanate trimer is believed to provide one or more of the following benefits: (i) enhanced safety for personnel handling the isocyanate trimer as compared to diisocyanates, (ii) incorporation of additional crosslinking sites in the binder polymer, (iii) avoidance of gelling during production of the binder polymer, and/or (iv) manufacturing cost savings due to reduced processing time in obtaining a polyester polymer having a suitably high molecular weight. Moreover, as compared, for example, to cured coatings based on a blend of polyester and blocked isocyanate, incorporation of partially blocked isocyanate trimers into a polyester binder polymer can result in reduced extractables.

In a presently preferred embodiment, the partially blocked polyisocyanate is a trimer compound having two free isocyanates and one blocked isocyanate.

Examples of suitable agents for blocking isocyanate groups include phenols, such as phenol, cresol, xylenol, ethylphenol, t-butylphenol, hydroxybenzoic acid and esters of this acid, or 2,5-di-tert-butyl-4-hydroxytoluene; lactams, such as ε-caprolactam, δ-valerolactam, γ-butyrolactam or β-propiolactam; active methylenic compounds, such as diethyl malonate, dimethyl malonate, ethyl or methyl acetoacetate, or acetylacetone; alcohols, such as ethanol, n-propanol, isopropanol, n-butanol, isobutanol, t-butanol, n-amyl alcohol, t-amyl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, or diacetone alcohol; amides, such as acetoanilide, acetoanisidinamide, acrylamide, methacrylamide, acetamide, stearamide or benzamide; imides, such as succinimide, phthalimide or maleimide; amines, such as diphenylamine, phenylnaphthylamine, xylidine, N-phenylxylidine, carbazole, aniline, naphthylamine, butylamine, dibutylamine, diisopropylamine or butylphenylamine; imidazoles, such as imidazole or 2-ethylimidazole; ureas, such as urea, thiourea, ethyleneurea, ethylenethiourea or 1,3-diphenylurea; carbamates, such as phenyl N-phenylcarbamate or 2-oxazolidone; imines, such as ethyleneimine; oximes, such as acetone oxime, formaldoxime, acetaldoxime, acetoxime, methyl ethyl ketoxime, diisobutyl ketoxime, diacetyl monoxime, benzophenone oxime or chlorohexanone oximes; salts of sulfurous acid, such as sodium bisulfite or potassium bisulfite; hydroxamic esters, such as benzyl methacrylohydroxamate (BMH) or allyl methacrylohydroxamate; substituted pyrazoles and triazoles; oxirane-containing compounds such as glycidol; other compounds containing one or more groups that are reactive with isocyanate groups and one or more non- or less-reactive groups with isocyanate groups (e.g., acrylamide, amino alcohols, acids alcohol, amino acids, oxirane-containing compounds such as glycidol, etc.); or mixtures thereof.

Blocking agents that react with isocyanate groups to form deblockable isocyanate groups are preferred blocking agents. If desired, such "deblockable" blocking agents may be used in combination with one or more "non-deblockable" blocking agents. Presently preferred blocking agents for forming deblockable isocyanate groups include ε-caprolactam, diisopropylamine (DIPA), methyl ethyl ketoxime (MEKO), and mixtures thereof. Presently preferred blocking agents for forming non-deblockable isocyanate groups include glycidol, hydroxyethyl acrylate, and mixtures thereof.

The binder polymer may be formed using any suitable amount of one or more polyester oligomers or polymers and one or more partially blocked polyisocyanate compounds. In certain preferred embodiments, the binder polymer includes one or more polyester oligomers or polymers in an amount from about 10 to about 99 weight percent ("wt-%"), more preferably from about 25 to about 95 wt-%, and even more preferably from about 50 to about 90 wt-%, based on the total non-volatile weight of reactants used to form the binder polymer. In certain preferred embodiments, the binder polymer includes one or more polyisocyanate compounds, which are preferably partially blocked, in an amount from about 1 to about 90 wt-%, more preferably from about 5 to about 75 wt-%, and even more preferably from about 10 to about 50 wt-%, based on the total non-volatile weight of the reactants used to form the binder polymer.

If water dispersibility of the binder polymer is desired, a suitable amount of salt-containing and/or salt-forming groups may be included in the polymer to facilitate preparation of an aqueous dispersion or solution. Suitable salt-forming groups may include neutralizable groups such as acidic or basic groups. At least a portion of the salt-forming groups may be neutralized to form salt groups useful for dispersing the binder polymer into an aqueous carrier. Acidic or basic salt-forming groups may be introduced into the binder polymer by any suitable method.

In some embodiments, a water-dispersible binder polymer is achieved through inclusion of a sufficient number of acid (e.g., carboxylic acid) and/or anhydride groups in the polymer. By way of example, a water-dispersible binder polymer is provided through incorporation of an acid- or anhydride-functional monomer into the binder polymer to produce an acid- or anhydride-functional binder polymer, which may be at least partially neutralized to disperse the binder polymer into an aqueous carrier. Any suitable method may be used to incorporate the acid- or anhydride-functional monomer into the binder polymer, including, for example, (i) producing the binder polymer from reactants including the acid- or anhydride-functional polymer or (ii) modifying a preformed binder polymer to include the acid- or anhydride-functional polymer.

Examples of suitable materials for incorporating acid and/or anhydride groups into the binder polymer include any anhydride-functional compound such as tetrahydrophthalic anhydride, pyromellitic anhydride, succinic anhydride, phthalic anhydride, maleic anhydride, trimellitic anhydride ("TMA"), and mixtures thereof. In some embodiments, TMA is reacted with a polyol having three or more hydroxyl groups, to produce a polyol-anhydride adduct useful in making the water-dispersible polymer. In one embodiment, the polyol is a hydroxyl-terminated polyester polymer or oligomer having one or more pendant hydroxyl groups, which is reacted with an anhydride-functional compound such as TMA to produce a hydroxyl-terminated polyester having carboxylic functionality. The conditions of the reaction are controlled, including the temperature, to avoid gelling. The resulting carboxylic-functional polyester oligomer or polymer is neutralized (e.g., using a base such as an amine) to produce an aqueous dispersion.

In some embodiments, it is contemplated that water dispersibility may be provided through use of acid-functional ethylenically unsaturated monomers (e.g., acrylic monomers) that have been grafted onto the polyester to form a polyester-acrylic copolymer, whereby a suitable number of the acid-functional groups are neutralized with base (such as, e.g., a tertiary amine) to produce salt groups. See for example, U.S. Pat. App. No. 20050196629 for examples of such techniques.

Trimellitic anhydride is an example of a preferred anhydride-functional monomer. In one embodiment, trimellitic anhydride is reacted with a polyester intermediate (preferably having three or more hydroxyl groups) to produce an acid-functional polyester polyol adduct. The acid-functional polyester polyol adduct may then be reacted with a partially blocked polyisocyanate compound to form a water-dispersible binder polymer of the invention.

In some embodiments, the binder polymer may include one or more aliphatic carbon-carbon double bonds, more preferably a plurality of such double bonds. While not intending to be bound by any theory, it is believed that the presence of aliphatic carbon-carbon double bonds in the binder polymer may enhance one or more coating properties (e.g., corrosion resistance) and/or allow a given balance of desired coating properties to be achieved with a lesser amount of blocked isocyanate groups.

Iodine value is a useful measure of the number of aliphatic carbon-carbon double bonds present in a polymer. In some embodiments, the binder polymer of the invention is an unsaturated polymer having an iodine value of at least about 10, more preferably at least about 20, even more preferably at least about 35, and optimally at least about 50. The upper range of suitable iodine values is not limited, but in most embodiments the iodine value typically will not exceed about 100 or about 120. The aforementioned iodine values correspond to the number of grams of iodine that will react with the double bonds present in 100 grams of the material. Iodine values may be determined, for example, using ASTM D 5758-02 (Reapproved 2006) entitled "Standard Method for Determination of Iodine Values of Tall Oil Fatty Acids."

In certain preferred embodiments, the one or more aliphatic carbon-carbon double bonds is preferably selected such that it is capable of reacting with a resole-type phenolic crosslinker to form a covalent linkage (e.g., via an addition reaction such as a Diels-Alder reaction). Preferred unsaturated groups having one or more aliphatic carbon-carbon double bonds include organic groups having one or more activated carbon-carbon double bonds such as unsaturated bicyclic groups, conjugated (more preferably highly conjugated) alkenyl groups which can be substituted or unsubstituted, or combinations thereof.

It is contemplated that any suitable type(s) of unsaturated bicyclic groups may be incorporated into the binder polymer. Norbornene groups (i.e., bicyclo[2.2.1]heptene groups present, e.g., in nadic anhydride) are presently preferred unsaturated bicyclic groups.

In some embodiments, the binder polymer includes one or more unsaturated bicyclic groups (e.g., $\geq 2$, $\geq 3$, $\geq 4$, $\geq 5$, $\geq 10$, etc.), which may be backbone or pendant groups, or a combination thereof. Unsaturated bicyclic groups may be incorporated in the binder polymer at any suitable time using any suitable materials and techniques.

For example, a reactant including one or more unsaturated bicyclic groups may be used such as, for example, nadic acid or anhydride, tetrahydrophthalic acid or anhydride, methyl-nadic acid or anhydride, carbic acid or anhydride, and mixtures thereof. Such reactants may be used, for example, in forming a polyester oligomer or polymer from which the binder polymer is formed. Such reactants may also be grafted onto the binder polymer via reaction of complimentary groups on the binder polymer and the reactant (e.g., a hydroxyl group on the binder polymer and an anhydride on the reactant). In some embodiments, the binder polymer is formed from at least about 3 wt-%, more preferably at least about 5 wt-%, and even more preferably at least about 10 wt-% of such unsaturated bicyclic reactants. The upper concentration of such reactants is not especially limited, but in some embodiments the binder polymer includes less than about 30 wt-% of such unsaturated bicyclic reactants.

Alternatively, one or more unsaturated bicyclic groups may be formed in situ using, for example, a Diels-Alder reaction mechanism. Materials and methods for producing an unsaturated bicyclic Diels-Alder reaction product are discussed in WO 2008/124682. Non-limiting examples of other useful Diels-Alder reactants may include anthracene, cyclohexadiene, cyclopentadiene (including, e.g., 1-alkyl cyclopentadienes or 2-alkyl cyclopentadienes), dicyclopentadiene, furan, thiophene, and combinations thereof. For example, in one embodiment, an unsaturated component (e.g., maleic anhydride) is incorporated into an oligomer or polymer used in forming the binder polymer (e.g., a polyester oligomer or polymer) and the unsaturated component is modified via a Diels-Alder reaction to include an unsaturated bicyclic group either before or after incorporation into the oligomer or polymer.

It is contemplated that any suitable type(s) of unsaturated bicyclic groups may be incorporated into the binder polymer.

Norbornene groups (i.e., bicyclo[2.2.1]heptene) are presently preferred unsaturated bicyclic groups.

The invention further provides coating compositions suitable for coating a variety of substrates including, for example, the interior or exterior surfaces of packaging articles. Preferred coating compositions of the invention are particularly suited for use on metal food or beverage containers, including on interior surfaces thereof.

Certain coating compositions of the invention are preferably substantially free, more preferably essentially free, even more preferably essentially completely free, and optimally completely free of at least one of, and more preferably both of:

(A) mobile bisphenol A (BPA) and aromatic glycidyl ether compounds (e.g., diglycidyl ethers of bisphenol A (BADGE), diglycidyl ethers of bisphenol F (BFDGE), and epoxy novalacs); or (B) bound BPA and aromatic glycidyl ether compounds (e.g., BADGE, BFDGE and epoxy novolacs).

In some embodiments, coating compositions of the invention are free (i.e., do not contain any measurable amounts) or substantially free of one or more (i.e., two, three, or four) of the below compounds C-F. (The definition previously provided in the Selected Definitions section for the phrase "substantially free" does not apply in the context the following compounds C-F.).

(C) extractable formaldehyde-containing compounds (e.g., mobile formaldehyde-based crosslinkers);

(D) bound formaldehyde-containing compounds;

(E) oxirane-containing compounds (e.g., BADGE, BFDGE, epoxy novolacs, and epoxidized oils); or (F) polyvinylchloride or related halide-containing vinyl polymers.

In a presently preferred embodiment, the invention provides a coating that, when suitably cured, contains less than about 200 parts per billion ("ppb"), more preferably less than about 100 ppb, even more preferably less than about 50 ppb, and optimally less than about 10 ppb of extractable isocyanate-containing compounds. An example of a test methodology useful for determining the amount of extractable isocyanate-containing compounds present in a coating is provided below in the Test Methods section.

Preferred binder polymers are at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4' dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. In some embodiments, the coating composition of the invention is epoxy-free, or at least substantially epoxy-free.

Coating compositions of the invention may include any suitable amount of binder polymer to produce the desired result. In certain preferred embodiments, the coating compositions include at least about 15, more preferably at least about 20, and even more preferably at least about 25 wt-% of binder polymer, based on the total non-volatile weight of the coating composition. Preferably, the coating compositions include less than about 99, more preferably less than about 95, and even more preferably less than about 90 wt-% of the binder polymer, based on the total non-volatile weight of the coating compositions.

Preferred coating compositions include at least about 30, more preferably at least about 35, and even more preferably at least about 40 wt-% of solids, based on the total weight of the coating composition. Preferably, the coating compositions include less than about 80, more preferably less than about 70, and even more preferably less than about 65 wt-% of solids, based on the total weight of the coating composition.

In some embodiments, coating compositions of the invention may be formulated using one or more optional curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker.

For coating compositions of the invention that employ a self-crosslinking embodiment of the binder polymer, it may not be necessary or desirable to include a separate curing agent such as a crosslinker. For example, if a crosslinked coating is desired that is at least substantially free of bound and/or mobile formaldehyde-containing compounds, it may be advantageous to achieve suitable crosslinking through use of a self-crosslinkable binder polymer alone and/or through use of a suitable amount of crosslinker that does not contain formaldehyde. Similarly, if an isocyanate-crosslinked coating is desired, incorporation of deblockable isocyanate groups into a self-crosslinking binder polymer of the invention may provide a cured coating that exhibits reduced migration (or substantially no migration) of mobile isocyanate compounds due to the isocyanate compounds being bound in the binder polymer.

When present, the concentration of one or more optional crosslinkers may vary depending upon the desired result. For example, in some embodiments, the coating compositions may contain from about 0.01 wt-% to about 30 wt-%, more preferably from about 0.5 wt-% to about 25 wt-%, or even more preferably from about 3 wt-% to about 20 wt-% of one or more crosslinkers, by weight of nonvolatile material in the coating composition.

Suitable crosslinkers include phenolic crosslinkers (e.g., phenoplasts), amino crosslinkers (e.g., aminoplasts), and combinations thereof. Phenolic crosslinkers are preferred crosslinkers, with resole-type phenolic crosslinker being particularly preferred. While any suitable crosslinker may be used, preferred crosslinkers are capable of reacting with isocyanate groups and/or isocyanate-reactive groups present on the binder polymer to form a covalent linkage therewith. In a certain presently preferred embodiment, a hydroxyl-reactive crosslinker is included in the coating composition.

Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, BPA, and combinations thereof. Examples of suitable commercially available phenolic compounds include the BAKELITE 6535LB, 6581 LB, and 6812LB products (each available from Hexion Specialty Chemicals GmbH), the DUREZ 33162 product (Durez Corporation, Addison, Tex.), the PHE- NODUR PR 285 55/IBB and PR 897 products (each available from CYTEC Surface Specialties, Smyrna, Ga.), and SANTOLINK EP 560 products. Examples of suitable resole-type phenolic crosslinkers include the BAKELITE 6535LB product, the DUREZ 33162 product, the VARCUM 6470 product, and combinations thereof.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, the CYMEL 301, 303, 370, 373, 1131, 1125, and 5010 products (all available from Cytec Industries Inc., West Patterson, N.J.); the MAPRENAL MF 980 product (Cytec Industries Inc.); and the URAMEX BF 892 product (available from DSM, Netherlands).

The coating composition may also include an optional catalyst to increase the rate of cure. If used, a catalyst is preferably present in an amount of from about 0.05 wt-% to about 1 wt-%, and more preferably from about 0.1 wt-% to about 0.5 wt-% of nonvolatile material. Examples of catalysts suitable for use in curing the one or more optional crosslinkers may include acid catalysts such as phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP) and the like, and mixtures thereof. Examples of catalysts suitable for use in curing self-crosslinker binder polymers of the invention include tertiary amines, certain metallic compounds (e.g., tin, bismuth, etc.), or mixtures thereof.

If desired, coating compositions of the invention may optionally include other additives that do not adversely affect the coating composition or a cured coating resulting therefrom. The optional additives are preferably at least substantially free of mobile and/or bound BPA and aromatic glycidyl ether compounds (e.g., BADGE, BFDGE and epoxy novolac compounds). Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, or combinations thereof. Each optional ingredient can be included in a sufficient amount to serve its intended purpose, but preferably not in such an amount to adversely affect a coating composition or a cured coating resulting therefrom.

Any suitable carrier may be used to prepare coating compositions of the invention. Suitable carriers include carrier liquids such as organic solvents, water, and mixtures thereof. Suitable organic solvents include aliphatic hydrocarbons (e.g. mineral spirits, kerosene, high flashpoint VM&P naptha, and the like); aromatic hydrocarbons (e.g. benzene, toluene, xylene, solvent naphtha 100, 150, 200 and the like); alcohols (e.g. ethanol, n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol); glycol ethers (e.g. ethylene glycol monomethyl ether, ethylene glycol monoethyl ether, ethylene glycol monobutyl ether, propylene glycol monomethyl ether, and the like); glycol esters (e.g. butyl glycol acetate, methoxypropyl acetate and the like); and mixtures thereof. Preferably, the liquid carrier(s) are selected to provide a dispersion or solution of the polyester polymer of the invention for further formulation.

Coating compositions of the invention may be prepared by conventional methods in various ways. For example, the coating compositions may be prepared by simply admixing the binder polymer, optional crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, the binder polymer, optional crosslinker, and any other optional ingredients, in any desired order, with sufficient agitation. An additional amount of carrier liquid may be added to the coating compositions to adjust the amount of nonvolatile material in the coating composition to a desired level.

In some embodiments, the coating composition of the invention is a water-based coating composition. In some such embodiments, preferably at least about 50 wt-% of the liquid carrier system is water, more preferably at least about 60 wt-% is water, and even more preferably at least about 75 wt-% is water. Certain coating compositions of the invention include at least about 10 wt-% of water, more preferably at least about 20 wt-% of water, and even more preferably at least about 40 wt-% of water (in some embodiment about 50 wt-% or more of water), based on the total weight of the coating composition.

In some embodiments, the coating composition is a solvent-based coating composition that is preferably substantially free of water (e.g., contains 2 wt-% or less of water.)

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

Cured coatings of the invention are particularly well suited as adherent coatings for metal cans or containers, although many other types of articles can be coated. Examples of such articles include closures (including, e.g., internal surfaces of twist off caps for food and beverage containers); internal crowns; two and three-piece cans (including, e.g., food and beverage containers); shallow drawn cans; deep drawn cans (including, e.g., multi-stage draw and redraw food cans); can ends (including, e.g., easy open can ends or beer and beverage can ends); monobloc aerosol containers; medical packaging articles; and general industrial containers, cans, and can ends.

As previously mentioned, preferred coating compositions of the invention are particularly suited for use in forming food-contact coatings on metal surfaces of food or beverage containers (e.g., interior surfaces of food or beverage cans). Preferably, the cured coatings are retortable when employed in food or beverage container applications. Preferred cured coatings are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Examples of such aggressive food or beverage products may include meat-based products, milk-based products, fruit-based products, energy drinks, and acidic or acidified products.

It is further contemplated that the coating composition of the invention has utility outside of packaging coating applications. Examples of such applications may include other coating applications such as industrial coatings.

Coating compositions of the invention can be applied in a single coat, or monocoat, system or can constitute one or more layers of a multi-coat system. The coating compositions can be applied, for example, either directly to a substrate or to one or more intermediate coats (e.g., size coats) applied to the substrate.

In some embodiments, the coating composition of the invention may be applied as a monocoat directly to, for example, an exterior or interior (i.e., food-contact) surface of a metal food or beverage container.

In some embodiments, the coating composition can comprise one or more layers of a multi-coat system suitable for use as a food-contact coating. For example, a layer including the binder polymer of the invention may be applied as a base (or size) coat with one or more layers applied on the size layer. Some examples of such multi-coat systems include (i) coatings having two or more layers of the coating composition of the invention and (ii) coatings that include an organosol topcoat applied on a size coat formed from the coating composition of the invention. It is within the scope of the invention to use any suitable organosol or other thermoplastic dispersion (e.g., dispersions of halogenated polyolefins) known in the art. Suitable such organosols and/or thermoplastic dispersions include, for example, those described in U.S. Pat. No. 7,682,674, 6,916,874, U.S. Pat. App. No. 2007/0036903, U.S. patent application Ser. No. 12/597,986 filed on Oct. 28, 2009 and entitled "Coating System," and International Pub. No. WO2010/062844.

Organosol coating compositions are typically formulated using dispersions of thermoplastic material such as halogenated polyolefins, which include, for example, copolymers and homopolymers of vinyl chloride, vinylidenefluoride, polychloroprene, polychloroisoprene, polychlorobutylene, and copolymers and combinations thereof. Polyvinyl chloride ("PVC") is a preferred thermoplastic material, with dispersions of PVC particles being particularly preferred. The thermoplastic material preferably has a number average molecular weight of from about 40,000 to about 300,0000; more preferably from about 75,000 to about 200,000, and even more preferably from about 100,000 to 150,000. The use of dispersion grade thermoplastic particles is preferred, where the particles range in size from greater than 0 to about 5 microns, based on volume-average median particle diameter. Other sizes, however, can be used such as, for example, non-dispersion grade thermoplastic particles that range in size from about 5 to about 100 microns, based on volume-average median particle diameter.

The thermoplastic material is preferably dispersed in a liquid carrier to form a thermoplastic dispersion. Examples of suitable liquid carriers include an organic solvent, a plasticizer, or mixtures thereof. Suitable organic solvents may include polar solvents such as ketones (e.g., MIBK and DIBK), glycol ethers, alcohols, aliphatic hydrocarbons, aromatic hydrocarbons, or mixtures thereof. In some embodiments, it may be advantageous to choose a solvent that has an affinity to the thermoplastic material and/or one that can swell the thermoplastic particles to facilitate storage stability of the liquid coating composition. Preferred liquid carriers exhibit sufficient volatility to substantially evaporate from the coating composition during the curing process. The liquid carrier is preferably substantially non-aqueous (e.g., includes less 2 wt-% of water, if any).

Such organosol compositions preferably include at least about 10, more preferably at least about 15, and even more preferably at least about 20 wt-% of thermoplastic material, based on the total nonvolatile weight of the coating composition. The organosol compositions preferably include less than about 80, more preferably less than about 70, and even more preferably less than about 65 wt-% of thermoplastic material, based on the total nonvolatile weight of the coating composition.

In an embodiment, the organosol layer of a multi-coat composition of the present invention includes a polyester-carbamate polymer, more preferably a polyester-carbamate polymer such as that described herein, which is further exemplified in the Examples section below. In an embodiment, the organosol layer includes at least about 15, more preferably at least about 20, and even more preferably at least about 25 wt-% of a polyester-carbamate polymer, based on the total non-volatile weight of the organosol layer composition. Preferably, the organosol layer includes less than about 65, more preferably less than about 60, and even more preferably less than about 55 wt-% of polyester-carbamate polymer, based on the total non-volatile weight of the organosol layer composition.

The coating composition can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment, where the coating is used to coat metal sheets or coils, the coating can be applied by roll coating.

The coating composition can be applied on a substrate prior to, or after, forming the substrate into an article. In some embodiments, at least a portion of a planar substrate is coated with a layer of the coating composition of the invention, which is then cured before the planar substrate is formed into an article.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, coating compositions of the invention can be dried and cured in one step.

The curing process may be performed at any suitable temperature, including, for example, temperatures in the range of about 177° C. to about 250° C. If metal coil is the substrate to be coated, curing of the applied coating composition may be conducted, for example, by subjecting the coated metal to a temperature of about 225° C. to about 250° C. for typically about 10 to 30 seconds.

For embodiments of the binder polymer that employ deblockable isocyanate groups, the curing conditions are preferably suitably configured to achieve a desired amount of deblocking and crosslinking.

Test Methods

Unless indicated otherwise, the following test methods were utilized in the Examples that follow.

A. Retort Method

This test provides an indication of an ability of a coating to withstand conditions frequently associated with food or beverage preservation or sterilization. For the present evaluation, coated substrate samples (in the form, e.g., of ETP or TFS flat panels) were placed in a vessel and partially immersed in a test substance. While immersed in the test substance, the coated substrate samples were placed in an autoclave and subjected to heat of 130° C. and pressure of 1 atm above atmospheric pressure for a time period of 60 minutes. Just after retort, the coated substrate samples were tested for adhesion, blush resistance, and/or stain resistance.

B. Adhesion Test

Adhesion testing was performed to assess whether the coating compositions adhere to the coated substrate. The Adhesion Test was performed according to ASTM D 3359-Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush, a rating of "8" indicates slight whitening of the film, and a rating of "5" indicates whitening of the film, and so on. Blush ratings of 7 or more are typically desired for commercial packaging coatings and optimally 9 or above.

D. Solvent Resistance Test

The extent of "cure" or crosslinking of a coating is measured as a resistance to solvents, such as methyl ethyl ketone (MEK) or isopropyl alcohol (IPA). This test is performed as described in ASTM D 5402-93. The number of double rubs (i.e., one back-and-forth motion) is reported. Preferably, the MEK solvent resistance is at least 30 double rubs.

E. Wedge Bend Test

This test provides an indication of a level of flexibility of a coating and an extent of cure. For the present evaluation, test wedges were formed from coated rectangular metal test sheets (which measured 12 cm long by 5 cm wide). Test wedges were formed from the coated sheets by folding (i.e., bending) the sheets around a mandrel. To accomplish this, the mandrel was positioned on the coated sheets so that it was oriented parallel to, and equidistant from, the 12 cm edges of the sheets. The resulting test wedges had a 6 mm wedge diameter and a length of 12 cm. To assess the wedge bend properties of the coatings, the test wedges were positioned lengthwise in a metal block of a wedge bend tester and a 2.4 kg weight was dropped onto the test wedges from a height of 60 cm.

The deformed test wedges were then immersed in a copper sulphate test solution (prepared by combining 20 parts of $CuSO_4.5H_2O$, 70 parts of deionized water, and 10 parts of hydrochloric acid (36%)) for about 2 minutes. The exposed metal was examined under a microscope and the millimeters of coating failure along the deformation axis of the test wedges was measured.

The results of this test for coatings prepared according to the present invention are presented in Table 5A, with the data expressed as a wedge bend percentage using the following calculation:

$$100\% \times [(120\ mm) - (mm\ of\ failure)]/(120\ mm).$$

A mono-coat coating system is considered herein to satisfy the Wedge Bend Test if it exhibits a wedge bend percentage of 70% or more, whereas a two-coat coating system is considered herein to satisfy the test if it exhibits a wedge bend percentage of 85% or more.

F. Four-Corner Box Draw Test

This test provides an indication of both the flexibility and adhesion of a cured coating on a substrate. Typically, a coated flat panel is stamped into a five-sided box (a bottom wall, four sidewalls, and an open top) using a press equipped with a specific tool that presents four angles with different radiuses of curvature. For the data in the below Examples, a press model KE2130A from COFMO PRESSES (93297 Tremblay-France) was used. The tool enables the deformation of a 120×120 millimeter (mm) flat metal panel into a 50×60×17 mm box.

After formation of the box, each of the four corners of the box is visually inspected for tearing to assess the adherence of the coating. If no visual defects are observed for a particular corner, the corner is graded as a "pass." Preferably, two or more corners pass the four-corner box draw test, and optimally three or more corners.

G. Quantification of Mobile Isocyanate Compounds

This test measures the amount of extractable isocyanate present in a cured polymer coating. Mobile isocyanate compounds are extracted from the cured coating with acetonitrile for 24 hours at room temperature. A derivatisating agent is added to stabilize the free isocyanate groups concurrently with their extraction. The methodology is described in the following paper: M. Driffield, E. L. Bradley and L. Castle, Journal of Chromatography A, 1141 (2007) 61-66.

H. Stain Resistance Test

Stain resistance is generally measured visually using a scale of 0-10, where a rating of "10" indicates no staining and a rating of "0" indicates a complete change of the color of the film. Samples of coated substrate were rated for stain resistance as follows:

10: no discoloration of the coating observed
8-9: very slight discoloration of the coating observed
7: some discoloration of the coating observed
6: appreciable discoloration of the coating observed
2-5: strong discoloration of the coating observed
0-1: very strong discoloration of the coating observed Stain resistance ratings of at least 6 are typically desired for commercially viable coatings and optimally 8 or above. A coating is considered herein to satisfy the Stain Resistance Test if it exhibits a stain rating of at least 6 when tested as described above.

I. Porosity Test

This test provides an indication of the level of flexibility of a coating. Moreover, this test measures the ability of a coating to retain its integrity as it undergoes the formation process necessary to produce a food or beverage can end. In particular, it is a measure of the presence or absence of cracks or fractures in the formed end. To be suitable for food or beverage can end applications, a coating composition should preferably exhibit sufficient flexibility to accommodate the extreme contour of the rivet portion of the easy open food or beverage can end.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 206 standard opening can ends were exposed for a period of 4 seconds to an electrolyte solution comprised of 1% NaCl by weight in deionized water. Metal exposures were measured using a WACO Enamel Rater II, available from the Wilkens-Anderson Company, Chicago, Ill., with an output voltage of 6.3 volts. The measured electrical current, in milliamps (mA), is reported. End continuities are typically tested initially and then after the ends are subjected to pasteurization or retort.

A coating is considered herein to satisfy the Porosity Test if it passes an electric current (after end formation) of less than about 10 mA when tested as described above.

Preferred coatings of the present invention before retort or pasteurization pass less than about 10 mA when tested as described above, more preferably less than about 5, even more preferably less than about 2, and optimally less than about 1 mA. After pasteurization or retort, preferred coatings exhibit continuities of less than about 20, more preferably less than about 10, even more preferably less than about 5, and even more preferably less than about 2 mA.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Preparation of Hydroxyl-Terminated Polyesters A-C

Hydroxyl-terminated polyesters A-C were produced as described below.

The ingredients of each of polyesters A and B in the amounts indicated in Table 1 below were charged to a separate vessel equipped with a stirrer, reflux condenser, packed column, thermocouple, and a heating mantle. Each mixture was heated to a maximum of 250° C. During the reaction, water was extracted by distillation until an acid number of 15 to 25 was reached. Each polyester was then diluted with xylene to achieve a non-volatile content ("NVC") of about 93% by weight for polyester A and 95% by weight for polyester B. The mixtures were subjected to azeotropic distillation until an acid number of 7 was reached for polyester A and 5 for polyester B. After this step, each of polyesters A and B were then diluted with SOLVESSO 100 solvent to reach an NVC of about 70% by weight.

The ingredients of polyester C in the amounts indicated in Table 1 below were charged to a vessel equipped with a stirrer, reflux condenser, packed column, thermocouple, and a heating mantle. The mixture was heated to a maximum of 215° C. in such a manner that the temperature of the distillate at the top of the partial condenser did not exceed 102° C. During the reaction, water was extracted by distillation until an acid number of from 15 to 25 was reached. The polyester was then diluted with xylene to achieve an NVC of 94% by weight. The mixture was subjected to azeotropic distillation until an acid number of about 7 and a cut viscosity (75% in Xylene) around 150 Poises at 25° C. were reached. After this step, the polyester was then diluted with SOLVESSO 100 solvent to reach an NVC of about 70% by weight. The viscosity was 63 Poises at 25° C., the acid number 7.3, and the NVC 69.4% (1 g, 60 nm, 130° C.).

TABLE 1

| Ingredient | Amount (weight %) | | Amount (weight parts) |
| --- | --- | --- | --- |
| | Polyester A | Polyester B | Polyester C |
| Neopentylglycol | | 18.64 | 742.8 |
| Ethylene glycol | | 2.96 | |
| 1,4-cyclohexanedimethanol | 9.14 | 10.54 | 424 |
| 2-butyl-2-ethyl-1,3-propanediol | 31.49 | | |
| Monoethylene glycol | | | 119 |
| Nadic Anhydride | | | 330 |
| Sebacic acid | 27.96 | | |
| Isophthalic acid | | 37.28 | 1272 |
| RADIACID 960 | 31.41 | 30.58 | 517 |
| Dimer fatty acid | | | |
| Organometallic catalyst | 0.05 | 0.05 | 2 |
| Hydroquinone methyl ether | | | 2 |

Example 2

Preparation of Partially Blocked Polyisocyanate A

Partially blocked polyisocyanate compound A was produced using the ingredients listed in Table 2 below. The "dried" solvents in Table 2 were mixed in advance with molecular sieves to avoid the presence of water.

Partially blocked polyisocyanate compound A was produced by first dissolving VESTANATE 1890/100 isocyanate tablets in dried xylene in a reactor at 100° C. After 1 hour of mixing, caprolactam was added in the reactor. Complete dissolution of the caprolactam was observed after a few minutes. The reactor was slowly heated to 100° C. Following the heating step, the % NCO (i.e., the weight of isocyanate groups divided by the weight of the mixture in the reactor) of the mixture was determined by titration and the reaction was stopped when the theoretical % NCO was reached (i.e., in this case, the theoretical point at which one-third of the NCO groups were calculated to be blocked and two-thirds were calculated to be unblocked), which took less than 2 hours. The resulting mixture was then diluted with a second charge of xylene to obtain a mixture having an NVC of 60% by weight.

TABLE 2

| Ingredient | Amount (wt-%) |
|---|---|
| IPDI-based polyisocyanate* | 51.9 |
| Caprolactam | 8.1 |
| Dried xylene | 15 |
| Dried xylene charge 2 | 25 |

*VESTANATE 1890/100 product available from DEGUSSA.

Example 3

Production of Polyester-Carbamate Polymers

Polyester-carbamate polymers A-C were produced using the ingredients listed in Table 3 below.

Each of polyester-carbamate polymers A and B were produced as follows. The respective polyesters A and B were charged in a reactor and heated up to 70° C. Then, the partially blocked polyisocyanate mixture A was added to the reactor over 20 minutes using an addition funnel, which was washed with SOLVESSO 100 solvent after addition was complete. The reaction was continued until the mixture exhibited a stable viscosity, which took about 4 to 6 hours. The mixture was then diluted with DOWANOL PMA solvent for polyester-carbamate polymer A and butanol for polyester-carbamate polymer B.

Polyester-carbamate polymer C was produced as follows. Polyester C was charged in a reactor and heated up to 100° C. Then, the partially blocked polyisocyanate mixture A was added to the reactor over 10 minutes using an addition funnel, which was immediately flushed with SOLVESSO 100 solvent. The temperature was maintained around 100° C. and the reaction was continued until the mixture exhibited a stable viscosity and the NCO content was less than 0.01% (expressed in weight of NCO groups). Then butanol was added and the mixture was homogenized at 80° C. for 30 minutes. Finally, the additional SOLVESSO 100 solvent was added at 80° C. The viscosity was around 28 Poises at 25° C., no NCO was detectable by titration, and the NVC was 55.7% (1 g, 60 min, 130° C.).

TABLE 3

| Ingredient (in weight %) | Polyester-Carbamate Polymer A | B | C |
|---|---|---|---|
| Polyester A | 66.3 | | |
| Polyester B | | 58.4 | |
| Polyester C | | | 63.7 |
| Partially Blocked Polyisocyanate A | 14.3 | 23.5 | 17.3 |
| SOLVESSO 100 solvent | 4.0 | 2.7 | 3.56 |
| DOWANOL PMA solvent | | 15.4 | |
| Butanol | 15.4 | | 7.06 |
| SOLVESSO 100 solvent | | | 8.33 |

Example 4

Coating Composition

A coating composition was prepared that included the polyester-carbamate polymer A of Example 3. The coating composition was prepared using the ingredients listed below in Table 4. Ingredient 1 was placed in a clean vessel. Ingredients 2-4 were added slowly to the mixture under moderate agitation. Once the addition was complete, a premix of ingredients 5 and 6 was slowly added to the vessel. Ingredient 7 was then added and the agitation was maintained. The final viscosity and solids of the coating composition was adjusted with ingredient 8.

TABLE 4

| | Ingredient | Amount (wt-%) |
|---|---|---|
| 1 | Polyester-Carbamate A of Ex. 3 | 64.50 |
| 2 | Resole-type phenolic crosslinker | 8.58 |
| 3 | Resole-type phenolic crosslinker | 7.41 |
| 4 | Resole-type phenolic crosslinker | 3.83 |
| 5 | CYCAT 600 acid catalyst | 0.26 |
| 6 | Butanol | 1.03 |
| 7 | Lubrifiant K39 wax | 1.29 |
| 8 | Butyl glycol | 13.1 |
| | TOTAL: | 100 |

Example 5

Mono-Coat Food-Contact Coating

The coating composition of Example 4 was applied as a mono-coat coating system on both ETP and TFS substrate using a bar coater #12. The coated substrates were cured for 12 minutes in a 200° C. oven to obtain cured coatings that had a dry film weight of about 7 grams per square-meter (g/m2). The coated samples were subjected to various tests to assess the properties of the coating. The results of these tests are indicated below in Tables 5A and 5B.

TABLE 5A

Various Coating Property Test Results for the Mono-Coat System of Example 5

| | Cured Mono-Coat Coating of Example 5 | |
|---|---|---|
| Coating Properties | On ETP Substrate[1] | On TFS Substrate |
| Number of MEK Double-rubs | >50 | >50 |
| Adhesion | 100% OK | 100% OK |
| Hardness[2] | 1000 | 1200 |
| Static Coefficient of Friction[3] | 0.05-0.06 | 0.05-0.06 |
| Wedge Bend | 87.5% | |
| Crazing[4] | no evidence | |
| End Fabrication (non-post lube) | OK | OK |
| Porosity (average in milliamps for 6 can ends) | 8.3 mA | 13.4 mA |
| Global migration[5] (mg/dm$^2$) | 4.4 | |

[1] The ETP substrate was 2.8/2.8 ETP (i.e., ETP sheets having a tin weight on each side of the sheet of 2.8 g/m$^2$).
[2] The coating hardness was tested using a BykOdur testing apparatus. The principle of the test is to determine the force necessary to scratch the film of lacquer using a metallic nail on which a spring applies a given pressure. The nail is dragged along the film, and the pressure exerted on it is recorded.
[3] The static coefficient of friction was determined using an Altek testing apparatus.
[4] Crazing of the coating was determined via visual assessment. The film was examined for any sign of microcracking, with particular attention paid to on stressed/formed areas.
[5] Global migration was determined according to the European and FDA regulations for food contact compliance.

TABLE 5B

Retort Test Results for the Mono-Coat System of Example 5

| Retort Test | Blush | | Micro-blistering[3] | | Adhesion | | Porosity (mA) | |
|---|---|---|---|---|---|---|---|---|
| Material | ETP | TFS | ETP | TFS | ETP | TFS | ETP | TFS |
| "O" Material | 10 | 10 | | | 10 | 10 | 4 | 16.4 |
| "R" Material | 10 | 10 | | | 10 | 10 | 7.2 | 2.1 |
| "S" Material | 9 | 8 | 9/7 | 7/4 | 10 | 10 | 23.2 | >50 |
| Acetic acid (3%) + NaCl (2%)[2] | 10 | | 10/10 | 5/3 | 10 | | 22 | >50 |
| Lactic acid (1%)[2] | 10 | | 10/9 | 7/5 | 10 | | 16.4 | |
| NaCl (2%)[2] | 10 | 10 | | | 10 | 10 | 5.8 | 6.3 |

[1]The ETP substrate was 2.8/2.8 ETP.
[2]Each of these stimulant solutions was prepared using deionized water.
[3]A visual assessment was used to determine whether microblisters were present in the films. The results were ranked from 0 = very poor, to 10 = excellent (or defect-free). The X/Y format of the data corresponds, respectively, to flat/formed areas of the film.

As illustrated in the data of Table 5B above, the cured coatings exhibited good corrosion resistance properties when challenged with a wide variety of food simulants. In Table 5B, the "O" Material is a simulant solution for simulating the oxidizing properties of packaged food products that contain trace elements of materials that accelerate corrosion through their catalytic or depolarizing effect. The "R" Material is a simulant solution for simulating the corrosive properties of reducing products such as, for example, acidic fruits (e.g., grapefruit juice and tomato juice) and green beans. The "S" Material is a simulant solution for simulating the corrosive properties of packaged food products containing brine, acid, and sulfur and is a very aggressive test for inducing film blistering.

The above data in Tables 5A and 5B indicate that the coating composition of Example 5 may be successfully used as a mono-coat coating composition for food cans and food can ends intended for contact with a variety of packaged food products.

Example 6

Multi-Coat Food-Contact Coating

A multi-coat coating system was prepared having an organosol topcoat applied to a size coat formed from the coating composition of Example 4. The organosol topcoat was prepared from the ingredients listed below in Table 6.

TABLE 6

Organosol Topcoat

| Ingredient | Amount (wt-%) |
|---|---|
| Polyester-Carbamate B | 34.51 |
| GEON 178 PVC powder | 37.96 |
| Butyl glycol | 25.45 |
| Lubrifiant K39 lanolin wax | 1.04 |
| LubaPrint 436ND wax | 1.04 |
| Total | 100 |

The GEON 178 PVC powder was sifted gently into the polyester-carbamate resin B of Example 3 under moderate agitation. The remaining ingredients were then combined with this mixture and the resulting mixture was subjected to high speed dispersion for 20 minutes to produce the final organosol coating composition.

The coating composition of Example 4 was applied, using a bar coater #12, as a size coat on TFS sheets. The coated TFS sheets were then cured in a 200° C. oven for 10 minutes. After cooling, the organosol coating composition was applied on the cured size coat using a bar coater #14. The coated sheets were then placed in a 190° C. oven for 10 minutes.

TABLE 7

Results of Coating Tests for Two-Coat System

| Four-Corner Box Draw Test | Before Retort (interior/exterior) | 4/4 |
|---|---|---|
| | After Retort with 2% NaCl (exterior) | 4 |

Retort Tests

| Simulant | Blush | Adhesion | Micro-blistering[1] | Staining |
|---|---|---|---|---|
| NaCl (2%) | 10 | 10 | | |
| "R" Material | 10 | 10 | | |
| Acetic acid 1% + NaCl 1% | | 10 | 8/6 | |
| Sulfuration Simulant A | 10 | 10 | | 10 |
| Sulfuration Simulant B | 10 | 10 | | 10 |

[1]See footnote 3 of Table 5B.

The above retort tests were conducted at 130° C. for 60 minutes using regular food can ends.

As shown in the data of Table 7, the cured multi-coat system exhibited excellent coating properties.

Example 7

Preparation of Hydroxyl-Terminated Polyester

Hydroxyl-terminated polyester D was produced as described below. The ingredients of polyester D were introduced in the amounts indicated in Table 8 below (except Trimellitic Anhydride) into a vessel equipped with a stirrer, reflux condenser, packed column, thermocouple, and a heating mantle. During the reaction, water was extracted by distillation until an acid number lower than 3 was reached. The polyester was then diluted with DOWANOL PMA to achieve a non-volatile content ("NVC") of about 80%.

Acid functionality was introduced by adding into the reaction medium the trimellitic anhydride. The temperature of the reaction was maintained around 130° C. The reaction was pursued until reaching a stable acid number around 103-105. The polyester was then diluted with DOWANOL PMA to achieve an NVC of 80%.

TABLE 8

| Ingredient | Amount (wt-%) |
|---|---|
| Neopentylglycol | 30.02 |
| Trimethylol propane | 14.68 |
| Adipic acid | 18.32 |
| Isophthalic acid | 20.83 |
| Trimellitic anhydride | 16.06 |
| Dibutyl tin dilaurate (DBTL) | 0.07 |

Example 8

Preparation of Partially Blocked Polyisocyanate B

Partially blocked polyisocyanate compound B was produced using the ingredients listed in Table 9 below. The "dried" solvents in Table 9 were mixed in advance with molecular sieves to avoid the presence of water.

Partially blocked polyisocyanate compound B was produced by first dissolving DESMODUR 3390 isocyanate (available from Bayer) in dried cyclohexanone in a reactor at 60° C. DIPA was slowly added to avoid an exotherm above 70° C. Following the heating step, the % NCO of the mixture was determined by titration and the reaction was stopped when the theoretical % NCO was reached (i.e., in this case, the theoretical point at which one-third of the NCO groups were calculated to be blocked and two-thirds were calculated to be unblocked), which took less than 2 hours. The resulting mixture had an NVC of 85% by weight.

TABLE 9

| Ingredient | Amount (wt-%) |
|---|---|
| DESMODUR 3390 (90% NVC) | 80.371 |
| Diisopropyl amine 99% NVC (DIPA) | 12.794 |
| Cyclohexanone | 6.835 |

Example 9

Production of a Water-Dispersible Polyester-Carbamate Polymer

A water-dispersible polyester-carbamate polymer was produced using the ingredients listed in Table 10 below. Polyester D of Example 7 was first charged in a reactor and heated up to 60° C. Then, the partially blocked polyisocyanate mixture B was added to the reactor over 20 minutes using an addition funnel, which was washed with DOWANOL PMA solvent after addition was complete. The reaction was continued until the mixture exhibited a % NCO free lower than 0.2%. The mixture was then diluted with butyl cellosolve solvent. A premix (DMEA/water) was then added in 10 minutes to the reaction medium to form carboxylate salt. After a hold of 1 hour at 60° C., hot water (50° C.) was added to get an hydro-soluble polyester-carbamate at 35% NVC by weight.

TABLE 10

| Ingredient | Amount (wt-%) |
|---|---|
| Polyester D (80% NVC) | 29.794 |
| Partially Blocked Polyisocyanate B (85% NVC) | 13.134 |
| Butyl Cellosolve | 2.290 |
| DOWANOL PMA solvent | 0.842 |
| DMEA | 3.904 |
| WATER | 3.904 |
| Hot WATER | 46.132 |

Example 10

Water-Based Coating Composition

A water-based coating composition was prepared that included the polyester-carbamate polymer of Example 9. The coating composition was prepared using the ingredients listed below in Table 11. Ingredient 1 was placed in a clean vessel. Ingredients 2-4 were added slowly to the mixture under moderate agitation. The final viscosity and solids of the coating composition was adjusted with ingredient 5.

TABLE 11

| | Ingredient | Amount (wt-%) |
|---|---|---|
| 1 | Polyester-Carbamate of Ex. 9 (35% NVC) | 82.7 |
| 2 | Phenolic crosslinker (resole type) | 2.5 |
| 3 | Hexa methyl melamine crosslinker | 2.5 |
| 4 | Carnauba wax emulsion | 1 |
| 5 | Water | 11.3 |
| | TOTAL: | 100 |

The coating composition of Example 10 was applied at a dry film weight of 12 g/m$^2$ on an aluminium substrate and cured 10 seconds in an air pulsed oven in order to reach a PMT of 220-225° C. The panels were then tested for chemical resistance and examined after immersion in various solutions under the conditions described in Table 12 below. As illustrated by the data of Table 12, the coating exhibited good chemical resistance in a variety of challenge solutions.

TABLE 12

| Test Conditions | Blush | Adhesion | Stain |
|---|---|---|---|
| Dowfax test [45 min. at 185° F. (85° C.)] | 9 | 10 | |
| Water Pasteurization [30 min. at 153° F. (67.2° C.)] | 10 | 10 | |
| Water Process [90 min. at 250° F. (121.1° C.)] | 10 | 10 | |
| Gatorade Process [30 min. at 250° F. (121.1° C.)] | 8 | 10 | 10 |
| Coffee Process [60 min. at 250° F. (121.1° C.)] | 2 | 10 | 0 |

Example 11

Coating Composition

The coating was prepared by mixing the ingredients included in below in Table 13 using a stirrer. The viscosity of the resulting coating composition was adjusted with xylene to be in the range of 70 to 80 seconds as measured using a #4 Ford cup at 25° C. The NVC of the coating composition was determined to be 42.6% (1 g, 30 min, 200° C.).

TABLE 13

| Ingredient | Amount (weight parts) |
|---|---|
| Solvent mixture of dimethyl esters of C4 to C6 diacids | 6.81 |
| DOWANOL PMA solvent | 6.81 |
| SOLVESSO 100 solvent | 2.27 |
| Resole-type phenolic crosslinker | 15.68 |
| Resole-type phenolic crosslinker | 5.00 |
| Amino formaldehyde crosslinker | 0.73 |
| CYCAT 600 acid catalyst solution (20% in Butylglycol) | 0.91 |
| LUBAPRINT 436 wax | 3.18 |
| BYK 310 silicone solution (10% in Xylene) | 0.41 |
| Polyester carbamate C of Example 3 | 58 |
| Xylene | 5 |

The Example 11 coating composition was applied on ETP substrate (2.8/2.8) and coated substrate samples were cured for 10 minutes in a 200° C. oven to obtain cured coatings that had a dry film weight of about 7.9 g/m2. The cured samples were subjected to various tests to assess the properties of the coating. The results of these tests are indicated below in Tables 14A and 14B.

TABLE 14A

| | |
|---|---|
| Number of MEK Double-rubs | 50 |
| Wedge Bend | 77% |
| Crazing | no evidence |
| End Fabrication (non-post lube) | OK |
| Porosity (average in milliamps for 6 can ends) | 8.2 mA |

TABLE 14B

| Retort Test Material | Blush | Microblistering | Adhesion | Porosity (mA) Before Retort | Porosity (mA) After Retort |
|---|---|---|---|---|---|
| Water | 9 | 10 | 10 | | |
| 3% acetic acid | 8 | 10 | 10 | | |
| Sulfuration Simulant | 8 | 10 | 10 | | |
| NaCl (1%) | 9 | 10 | 10 | 8.2 | 11.1 |

Footnotes 1-3 of Table 5B are applicable to Table 14B.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method, comprising:
    providing a coating composition comprising a polymer having a polyester backbone and one or more pendant deblockable isocyanate groups attached to the backbone; and
    applying the coating composition on at least a portion of a metal substrate prior to, or after, forming the metal substrate into a food or beverage container, or a portion thereof.

2. The method of claim 1, wherein the polymer includes terminal hydroxyl groups.

3. The method of claim 1, wherein the polymer includes one or more terminal or pendant isocyanate-reactive groups attached to the backbone selected from amide groups, amino groups, carboxylic groups, phenol groups, thiol groups, urea groups, or combinations thereof.

4. The method of claim 1, wherein the polymer includes a plurality of carbamate groups in the polyester backbone of the polymer.

5. The method of claim 1, wherein the polymer comprises a reaction product of ingredients including a polyisocyanate compound having on average from about 1.5 to about to about 2.5 free isocyanate groups.

6. The method of claim 5, wherein the polyisocyanate compound comprises an isocyanate trimer.

7. The method of claim 1, wherein the coating composition further comprises a crosslinker.

8. The method of claim 1, wherein the coating composition further comprises a resole phenolic crosslinker.

9. The method of claim 1, wherein the polymer is a reaction product of ingredients comprising:
    (i) a partially blocked polyisocyanate having on average from about 1.5 to about to about 2.5 free isocyanate groups, and
    (ii) a hydroxyl-terminated polyester oligomer or polymer; and
    wherein the ratio of free isocyanate groups in (i) to terminal hydroxyl groups in (ii) is less than 1.

10. The method of claim 1, wherein the coating composition, based on total non-volatile weight, comprises:
    from about 15 to about 70 weight percent of the polymer; and
    from about 0.5 to about 30 weight percent of one or more crosslinkers.

11. The method of claim 1, wherein the polymer includes one or more aliphatic carbon-carbon double bonds.

12. The method of claim 1, wherein the polymer includes one or more unsaturated bicyclic groups.

13. The method of claim 1, further comprising: after applying the coating composition on the metal substrate, forming the metal substrate into the food or beverage container, or a portion thereof.

14. The method of claim 1, wherein the coating composition is applied onto a preformed food or beverage container or a preformed portion thereof.

15. The method of claim 1, wherein the coating composition is a solvent-based coating composition that is substantially free of water.

16. A method, comprising:
    providing a coating composition comprising:
        a polymer having a polyester backbone and one or more pendant deblockable isocyanate groups attached to the backbone, and
        a liquid carrier; and
    applying the coating composition on at least a portion of a metal substrate prior to, or after, forming the metal substrate into a food or beverage container, or a portion thereof.

17. The method of claim 16, wherein the coating composition is a solvent-based coating composition that is substantially free of water, and wherein the coating composition, based on total non-volatile weight, comprises: from about 15 to about 70 weight percent of the polymer; and from about 0.5 to about 30 weight percent of one or more crosslinkers.

18. The method of claim 16, wherein the coating composition is a water-based coating composition.

19. The method of claim 18, wherein the polymer includes one or more unsaturated bicyclic groups.

20. The method of claim 16, wherein the coating composition includes at least 40% by weight of water based on the total weight of the coating composition, and wherein the polymer is a reaction product of ingredients comprising:
    (i) a partially blocked polyisocyanate having on average from about 1.5 to about to about 2.5 free isocyanate groups, and
    (ii) a hydroxyl-terminated polyester oligomer or polymer; and
    wherein the ratio of free isocyanate groups in (i) to terminal hydroxyl groups in (ii) is less than 1.

* * * * *